H. H. EATON.
CUTTING DEVICE.
APPLICATION FILED OCT. 2, 1919.

1,371,357.

Patented Mar. 15, 1921.

INVENTOR
Harrison H. Eaton

UNITED STATES PATENT OFFICE.

HARRISON H. EATON, OF BEVERLY, MASSACHUSETTS, ASSIGNOR TO UNITED SHOE MACHINERY CORPORATION, OF PATERSON, NEW JERSEY, A CORPORATION OF NEW JERSEY.

CUTTING DEVICE.

1,371,357.

Specification of Letters Patent.    Patented Mar. 15, 1921.

Original application filed August 13, 1915, Serial No. 45,416. Divided and this application filed October 2, 1919. Serial No. 328,014.

*To all whom it may concern:*

Be it known that I, HARRISON H. EATON, a citizen of the United States, residing at Beverly, in the county of Essex and State of Massachusetts, have invented certain Improvements in Cutting Devices, of which the following description, in connection with the accompanying drawings, is a specification, like reference characters on the drawings indicating like parts in the several figures.

This invention relates to cutting devices and more particularly to devices for planing the surfaces of articles of wood or other like material.

The machines heretofore employed in planing the surfaces of cutting blocks, wherein the grain runs perpendicularly to the surface of the block, have frequently comprised cutting devices in the form of saws arranged to remove a layer of material at each operation of such thickness as greatly to lessen the life of the block. Other devices commonly used leave the surfaces in a more or less roughened condition.

It is an object of the present invention to provide an improved cutting means which is simple in construction, economical in operation and highly efficient in producing a smooth surface on the block or other article to be resurfaced.

In the illustrative construction the cutting means comprises a circular disk arranged to project at a relatively small angle from the surface of the cutter support which moves over the work in close proximity thereto, so that upon rotation of the support the disk removes material with a shearing cut. Preferably the disk is so secured in place that it may be readily adjusted to bring a fresh cutting edge into operative position.

In the illustrative construction, there is included a supporting member or base 2 having a lower, plane work engaging face of extended area for guiding the device in its movements over the surface of the work. The base also provides a supporting structure for a shaft 10 which extends downwardly in substantially perpendicular relation to the plane of the work engaging face of the member 2, the said shaft being operatively connected to a tool or cutter head 18. For a more complete disclosure of the mounting for the shaft 10 and of the mechanism for operating the shaft and the cutter head 18, reference should be had to the parent case which issued as Patent No. 1,329,383 under date of February 3, 1920.

Figure 2:
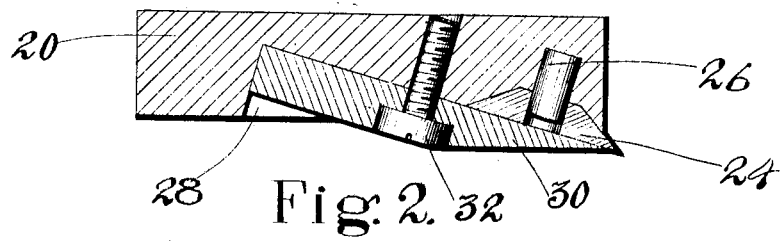
Fig. 2 is a section through a portion of the tool or cutter head illustrating in greater detail the preferred form of cutting member shown in Fig. 1.
Figure 1:
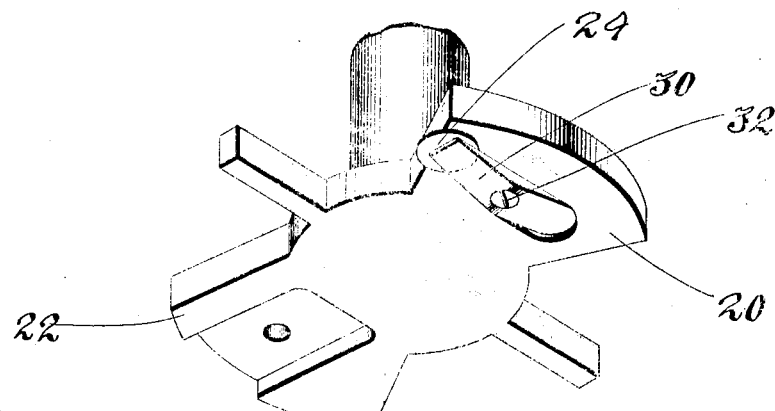
Figure 1 shows the operating tool or cutter head detached.
Figure 3:
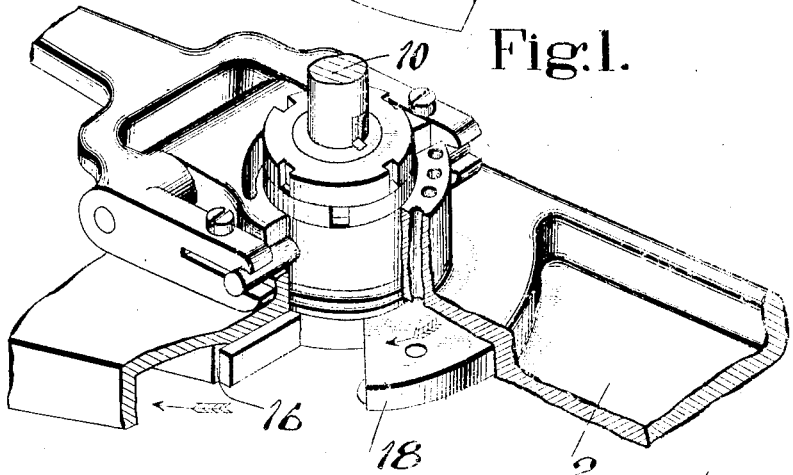
Fig. 3 is a perspective view with parts broken away illustrating the relation of the operating tool or cutter head to other elements of the structure.

The member 2 is provided in its work-engaging face with a substantially circular opening in the form of a recess 16 in which is mounted for rotation in a plane substantially parallel to the plane of said face, the tool or cutter head 18 having oppositely extending arms 20 and 22 formed respectively to carry different types of cutters or the like for operating upon the surface of the work. Preferably only one cutter will be used at a time, and the form which has been found most generally satisfactory in use is illustrated in Figs. 1 and 2 and comprises a circular disk 24 having a peripheral cutting edge and substantially frusto-conical in shape. This cutter is detachably and adjustably mounted upon a pin 26 at the forward end of a recess 28 cut in the lower face of the arm 20, the recess conforming to the shape of the upper face of the cutter, and the recess and the pin coöperating to position the cutter in a plane oblique to the plane of rotation of the tool or cutter head with the edge of the cutter projecting downwardly and forwardly from the front side of the arm 20. A clamp member 30 is secured in the recess 28 by means of a screw 32 and serves to maintain the cutter securely in place and, upon releasing or loosening the screw, the cutter may be turned to bring different portions of its cutting edge into working position.

The form of cutter shown in Figs. 1 and 2 has been found particularly satisfactory in operation upon hard and resistant material of the cutting blocks of die cutting machines, since by reason of the curved edge of the cutter it makes, for the most part, a shearing cut which is especially advantageous in cutting across the grain of wood and contributes materially to the formation of a smooth and finished surface. This cutter, moreover, is readily adjustable so that when one portion of its cutting edge has become dull, another portion may be brought quickly into operative position.

The arrangement whereby the tool or cutter head is caused to rotate in a plane substantially parallel to the surface of the work has the advantage, especially in a device for use in resurfacing cutting blocks, that the tool or cutter is caused to cut directly across the grain of the wood. This contributes materially to the effectiveness of the tool and to the formation of a smooth surface on the work.

Although the device embodying the invention has been described as of particular utility for resurfacing the cutting blocks of die cutting machines, it should be understood that it is by no means limited to this particular use.

Having thus described the invention, what is claimed as new and desired to be secured by Letters Patent of the United States is:—

1. A tool comprising a cutter support having a recess therein, a pin projecting from the support into said recess, a circular cutter mounted on said pin and adjustable to bring different portions of its cutting edge into position to engage the work, and a clamp secured to the cutter support in said recess and having one end engaging the outer surface of the cutter to retain the cutter in adjusted position on the pin.

2. A tool comprising a radial arm having a recess in its lower face, a circular cutter having a peripheral cutting edge mounted in said recess in position to project forwardly from said arm in the direction of rotation of the tool and in a plane oblique to the plane of rotation of the tool, said cutter being adjustable to bring different portions of its cutting edge into position to engage the work, and a clamp secured to said arm with one end projecting over the cutter to retain the cutter in adjusted position.

3. A tool for planing blocks of wood wherein the grain is perpendicular to the surface to be planed, comprising a cutter support provided with a flat face arranged to move over the surface of the work in close proximity thereto and having a recess therein, a circular cutter mounted in the recess at a relatively small angle to project from said face of the support so that the cutter shears across the grain of the block, and a clamp member for holding the cutter in position.

In testimony whereof I have signed my name to this specification.

HARRISON H. EATON.